US012427858B2

(12) United States Patent
Favaretto

(10) Patent No.: US 12,427,858 B2
(45) Date of Patent: Sep. 30, 2025

(54) FOUR-WHEEL DRIVE CAR

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/651,941

(22) Filed: May 1, 2024

(65) Prior Publication Data
US 2024/0367511 A1 Nov. 7, 2024

(30) Foreign Application Priority Data
May 5, 2023 (IT) .................. 102023000008961

(51) Int. Cl.
B60K 17/04 (2006.01)
B60K 17/22 (2006.01)
B60K 17/346 (2006.01)
B60K 5/00 (2006.01)

(52) U.S. Cl.
CPC .......... *B60K 17/346* (2013.01); *B60K 17/046* (2013.01); *B60K 17/22* (2013.01); *B60K 2005/003* (2013.01)

(58) Field of Classification Search
CPC .... B60K 17/346; B60K 17/046; B60K 17/22; B60K 2005/003; B60K 17/16; B60K 17/165; B60K 17/34; B60K 17/344; B60K 5/02; B60K 17/06; B60K 17/3467; F02B 2275/30; F02B 75/20; F02B 75/00
See application file for complete search history.

(56) References Cited

U.S. PATENT DOCUMENTS

| | | | | |
|---|---|---|---|---|
| 5,078,229 A | * | 1/1992 | Kikuchi | B60K 17/08 180/297 |
| 6,076,623 A | * | 6/2000 | Teraoka | B60K 17/346 180/250 |
| 11,041,456 B2 | | 6/2021 | Dalmas, II et al. | |
| 2022/0402359 A1 | | 12/2022 | Reisch et al. | |

FOREIGN PATENT DOCUMENTS

| | | | | |
|---|---|---|---|---|
| DE | 4409224 A1 | * | 10/1994 | ......... B60K 17/3462 |
| EP | 1713657 A2 | | 10/2006 | |
| EP | 3416844 A1 | | 12/2018 | |
| FR | 2695880 A1 | * | 3/1994 | ............. B60K 17/08 |

OTHER PUBLICATIONS

Italian Search Report for Application No. 202300008961; Filing Date: May 5, 2023; Date of Mailing: Oct. 5, 2023; 6 pages.

* cited by examiner

*Primary Examiner* — Justin Holmes
(74) *Attorney, Agent, or Firm* — CANTOR COLBURN LLP

(57) ABSTRACT

Car having: a first axle having two first drive wheels; a second axle having two second drive wheels; an internal combustion engine provided with a drive shaft; a transmission shaft configured to transmit the motion from the internal combustion engine to the first wheels; a gearbox provided with at least one primary shaft, which receives the motion from a drive shaft, and with at least one secondary shaft; a first epicyclic differential, which receives the motion from the secondary shaft of the gearbox and transmits the motion to the first wheels through the transmission shaft and to the second wheels; and a second epicyclic differential, which is coaxial to the two second wheels, is interposed between the first epicyclic differential and the second wheels, receives the motion from the first epicyclic differential and transmits the motion to the second wheels.

15 Claims, 12 Drawing Sheets

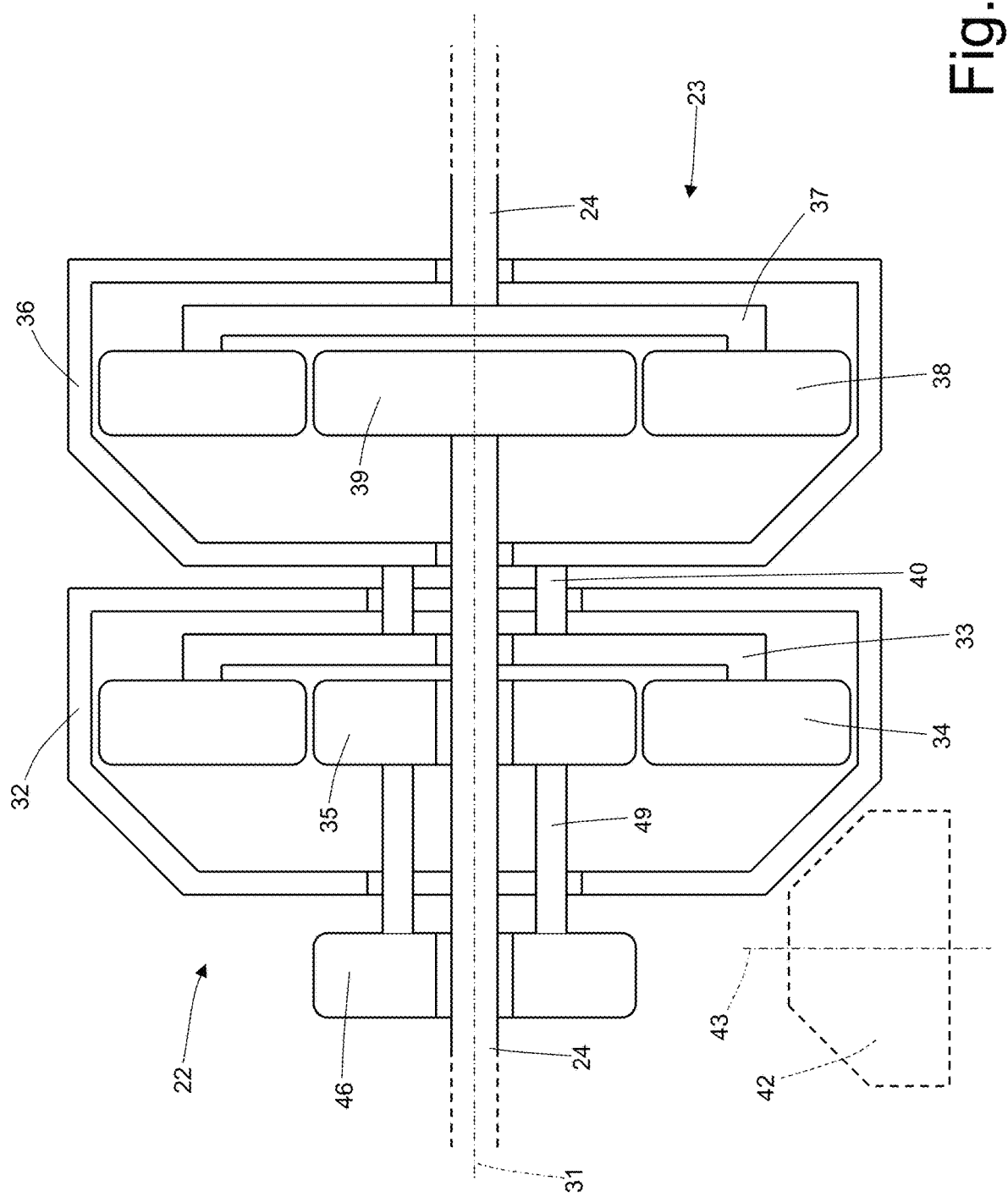

FOUR-WHEEL DRIVE CAR

CROSS-REFERENCE TO RELATED APPLICATIONS

This patent application claims priority from Italian patent application no. 102023000008961 filed on May 5, 2023, the entire disclosure of which is incorporated herein by reference.

FIELD OF THE ART

The present invention relates to a four-wheel drive car.

PRIOR ART

A four-wheel drive car has a transmission system that discharges the power generated by the engine onto all four wheels and thus allows for greater traction in all grip conditions.

Patents EP2142395B1 and EP2228249B1 describe an insertable four-wheel drive vehicle provided with: an engine having a drive shaft; a pair of main drive wheels; a main transmission line permanently connecting the drive shaft to the main drive wheels and comprising a gearbox and a main differential; a pair of normally driven secondary drive wheels; and an insertable secondary transmission line also adapted to connect the drive shaft to the secondary drive wheels and comprising at least one secondary clutch which on one side is connected to the drive shaft upstream of the gearbox and on the other side is connected to the secondary drive wheels.

Patent application US2022402359A1 describes an automotive transmission comprising an input shaft, a first output shaft, a second output shaft, a first planetary gearbox and a second planetary gearbox connected to the first planetary gearbox. The input shaft, the two output shafts and the planetary gearboxes are arranged and designed in such a way that the input torque through the input shaft is converted and distributed in a defined ratio to the two output shafts, preventing the formation of a combined torque.

DISCLOSURE OF THE INVENTION

The aim of the present invention is to provide a four-wheel drive car with an optimal distribution of masses, i.e. with its centre of gravity in a central position (between the two axles) and low (close to the road surface).

According to the present invention, a four-wheel drive car is provided in accordance with the appended claims.

BRIEF DESCRIPTION OF THE DRAWINGS

The present invention will now be described with reference to the accompanying drawings, showing some non-limiting embodiments thereof, wherein:

FIG. 12 is a schematic view of two epicyclic differentials of the transmission system of the car in FIG. 1.

PREFERRED EMBODIMENTS OF THE INVENTION

Figure 1:
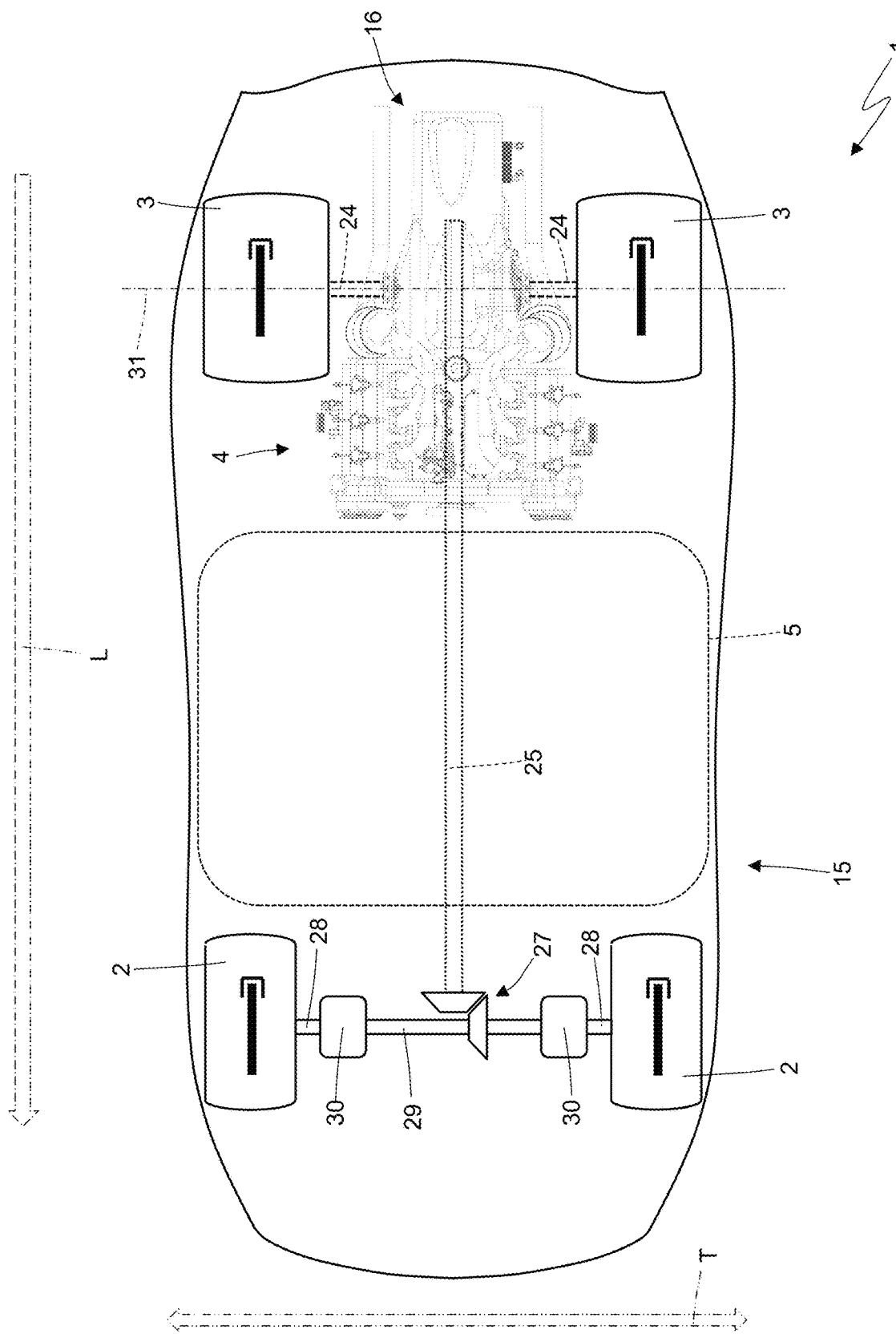
FIG. 1 is a schematic and plan view of a four-wheel drive car.

In FIG. 1, the number 1 denotes a car with two front drive wheels 2 (which are part of a front axle) and two rear drive wheels 3 (which are part of a rear axle). All the drive wheels 2 and 3 receive their drive torque from an internal combustion engine 4 positioned centrally (i.e. arranged between the front and rear axles).

In the car 1, two directions are identified: the longitudinal direction L which is horizontal and parallel to the driving direction of the car 1 and the transverse direction T which is horizontal and perpendicular to the driving direction of the car 1 (i.e. perpendicular to the longitudinal direction L). The longitudinal L and transverse T directions are horizontal and therefore perpendicular to the vertical direction V (shown in FIG. 7).

Figure 2:
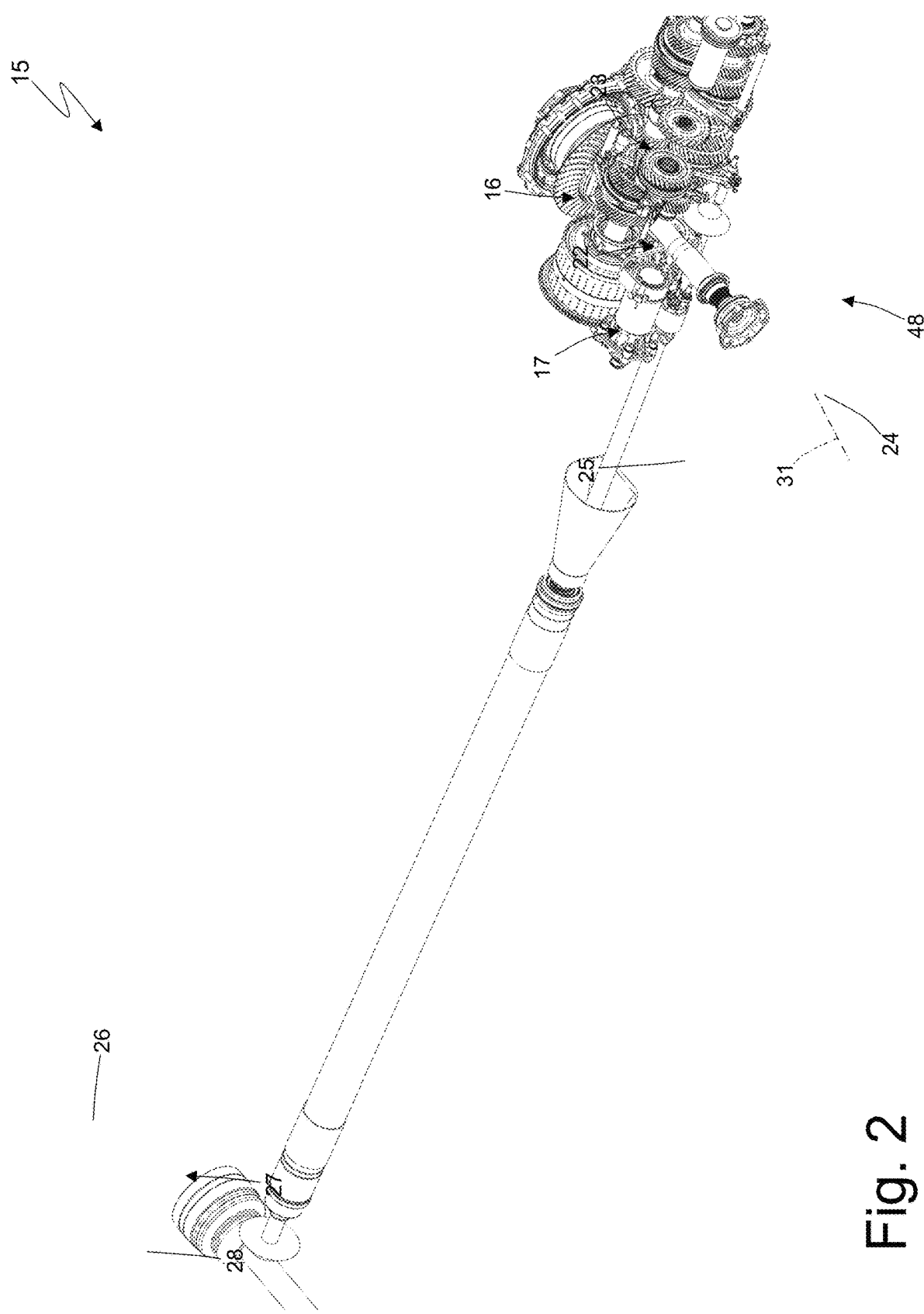
FIGS. 2 and 3 are two different perspective views and with parts removed for clarity of a transmission system of the car in FIG. 1.

As illustrated in FIGS. 1 and 2, the car 1 comprises a passenger compartment 5 which is arranged between the two front wheels 2 and the two rear wheels 3 and contains a driver's seat inside.

According to a possible embodiment, the internal combustion engine 4 is powered by hydrogen (or another gaseous fuel). According to a different embodiment, the internal combustion engine 4 is powered by petrol (or another liquid fuel).

Figure 7:
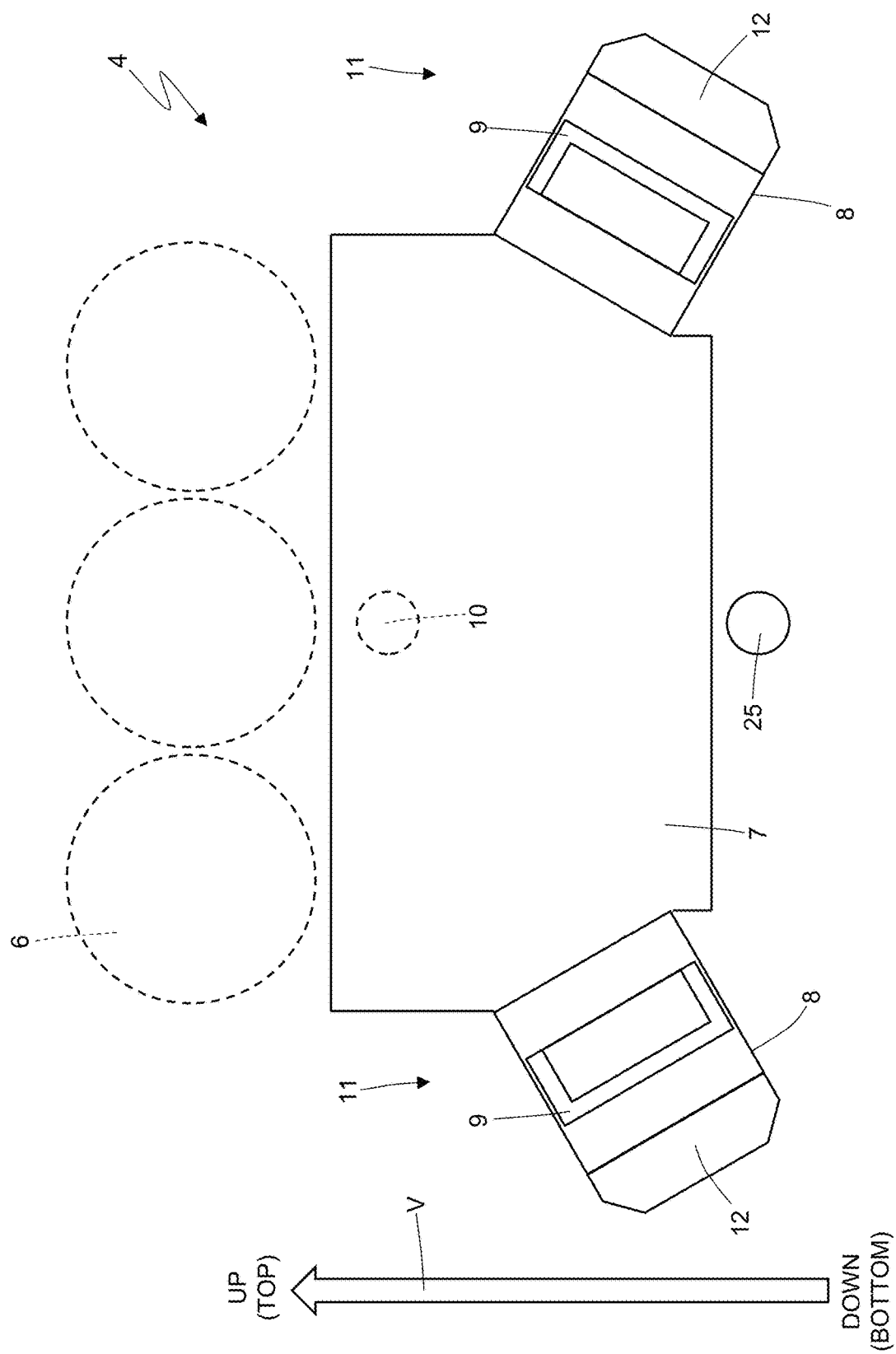

As illustrated in FIG. 7, the internal combustion engine 4 is powered by hydrogen, which is stored at high pressure (e.g. with a maximum pressure of approx. 700 bar) in a number of cylindrical-shaped tanks 6 which are arranged above the internal combustion engine 4; in the embodiment illustrated in FIG. 7, the tanks 6 are arranged longitudinally (i.e. their central axes of symmetry are oriented longitudinally), but alternatively they could be arranged transversely (i.e. their central axes of symmetry are oriented transversely).

According to what is illustrated in FIG. 7, the internal combustion engine 4 comprises a crankcase 7 within which a plurality of cylinders 8 are obtained. Each cylinder 8 has a respective combustion chamber and a respective piston 9 mechanically connected to a drive shaft 10 (by means of a respective connecting rod) to transmit the force generated by the combustion to the drive shaft 10 itself. The internal combustion engine 4 is arranged longitudinally, i.e. the drive shaft 10 is oriented longitudinally (parallel to a driving direction of the car 1).

The cylinders 8 are subdivided into two banks 11 which are separate from one another and inclined to define a "V" shape; i.e. the internal combustion engine 4 is shaped like a "V" and has two banks 11 of cylinders 8 which are separate from one other and angled. In other words, in the internal combustion engine 4, the blocks of cylinders 8 are separated from one other with respect to the axis of the drive shaft 10 by a certain angle, according to an arrangement shaped precisely like the letter "V". In the embodiment illustrated in the accompanying figures, the angle formed by the cylinders 8 is 120°, but according to other embodiments not illustrated, this angle could be different (e.g. slightly larger or slightly smaller).

Two heads (or cylinder heads) 12 are coupled (connected) to the crankcase 7, forming the top of the cylinders 8 (i.e. the upper end of the cylinders 8 with the so-called "flame plate"); obviously, given the "V"-shaped arrangement of the cylinders 8, there are twin cylinder heads 12 for the two banks 11 of cylinders 8. The assembly of the crankcase 7 and cylinder heads 12 together constitute the cylinder block of the internal combustion engine 4.

In the embodiment illustrated in the accompanying figures, the internal combustion engine 4 is arranged (oriented) longitudinally, i.e. the drive shaft 10 is arranged (oriented) longitudinally; in other embodiments not illustrated, the internal combustion engine 4 is arranged (oriented) transversely.

In the embodiment illustrated in the accompanying figures, the internal combustion engine 4 is either arranged in a central or rear position, i.e. the internal combustion engine 4 is arranged behind the passenger compartment 5 and is located between the front wheels 2 and the rear wheels 3 (central arrangement as illustrated in the accompanying figures) or is located beyond the rear 3 wheels (rear arrangement not illustrated).

According to what is illustrated in FIGS. 4-7, the internal combustion engine 4 is oriented vertically with the drive shaft 10 arranged higher than the cylinders 8. In other words, the internal combustion engine 4 is arranged "upside down" with respect to the traditional arrangement whereby the cylinders 8 are at the top and the drive shaft 10 is at the bottom. Therefore, the heads 12 which form the ceiling of the cylinders 8 are arranged below the crankcase 7 and represent the lowest part of the internal combustion engine 4.

Figure 4:
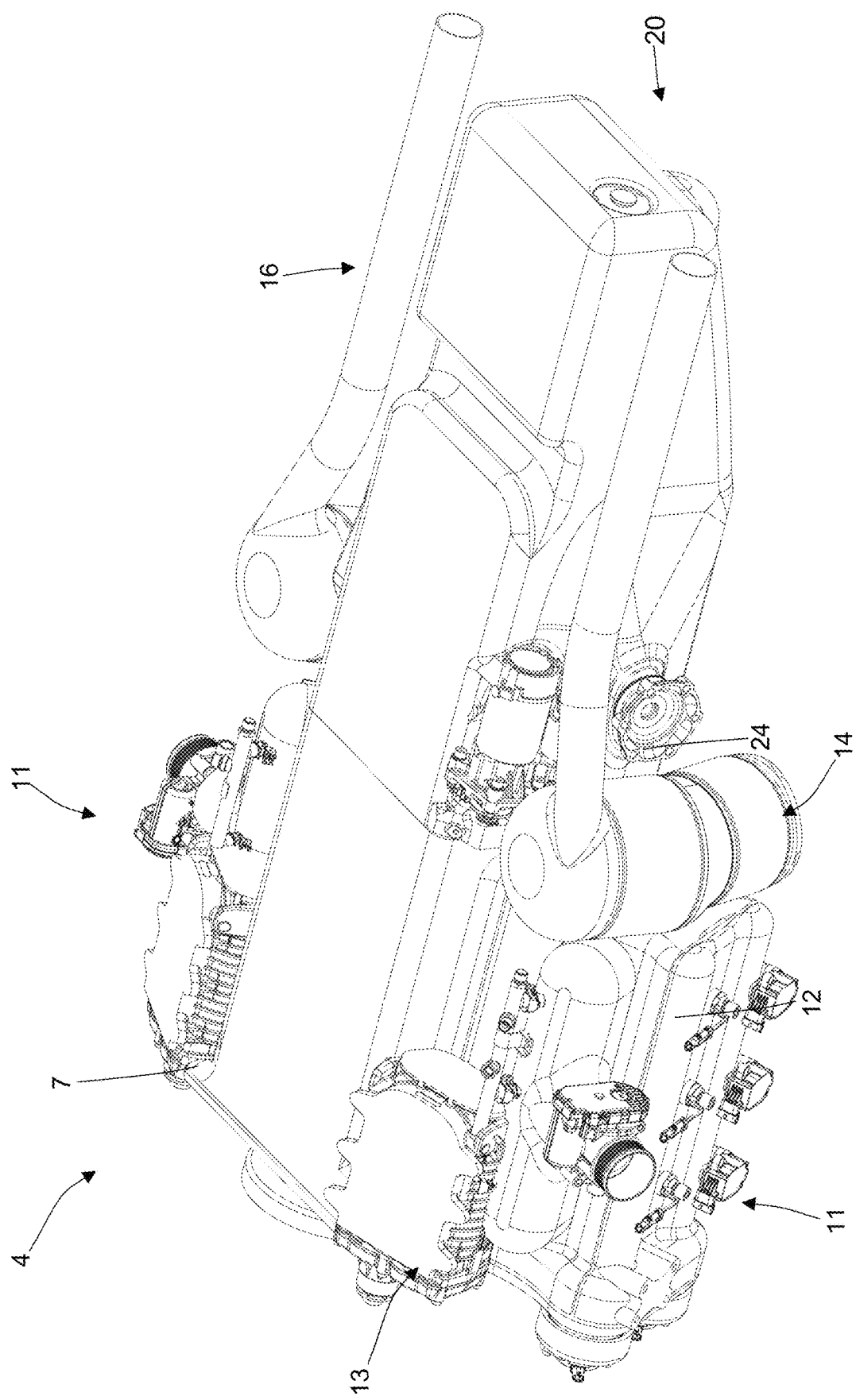
FIGS. 4-7 are an upper perspective view, a lower perspective view, a side view, and a front and schematic view, respectively, of an internal combustion engine of the car in FIG. 1.
Figure 5:
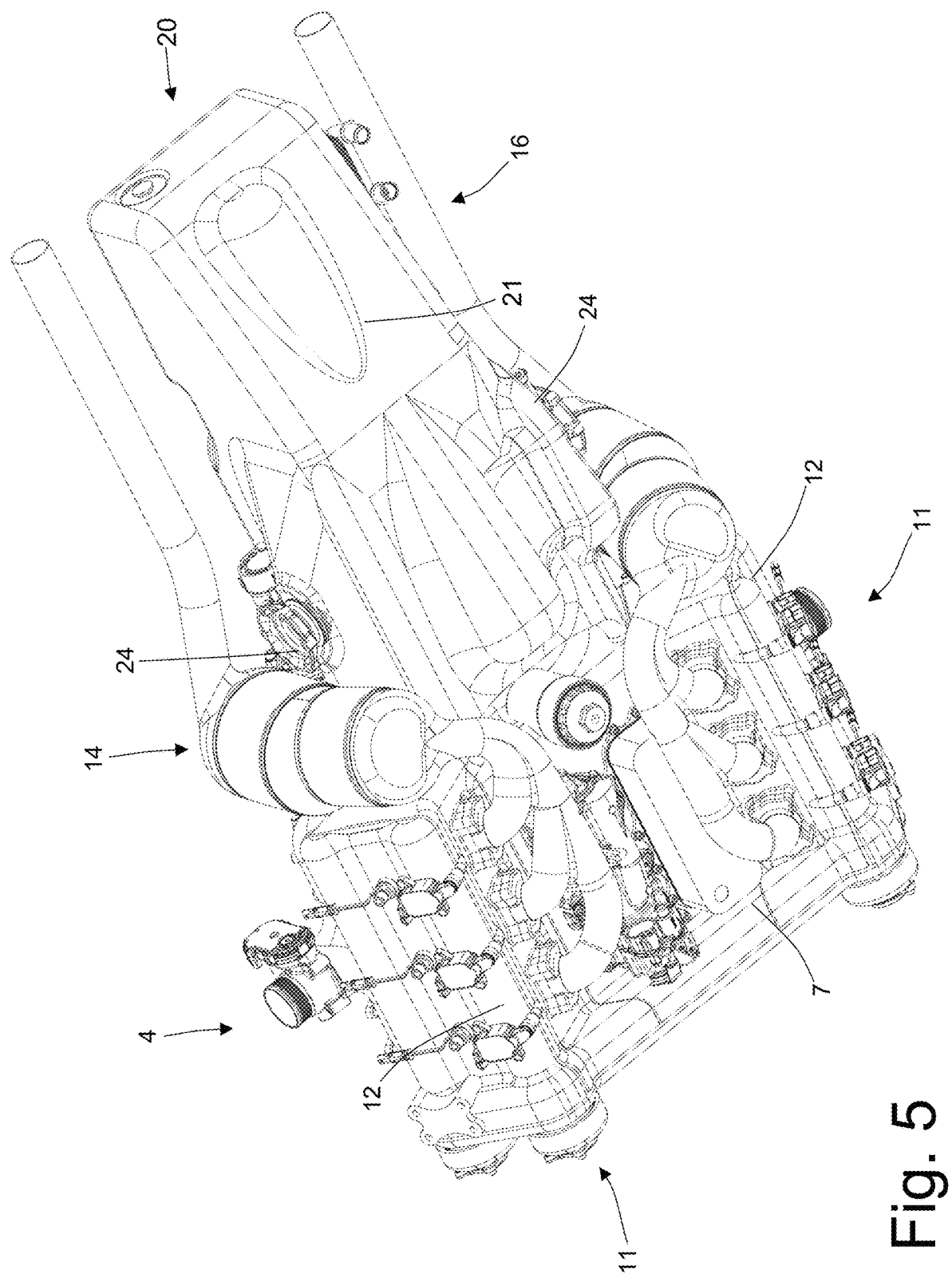
Figure 6:
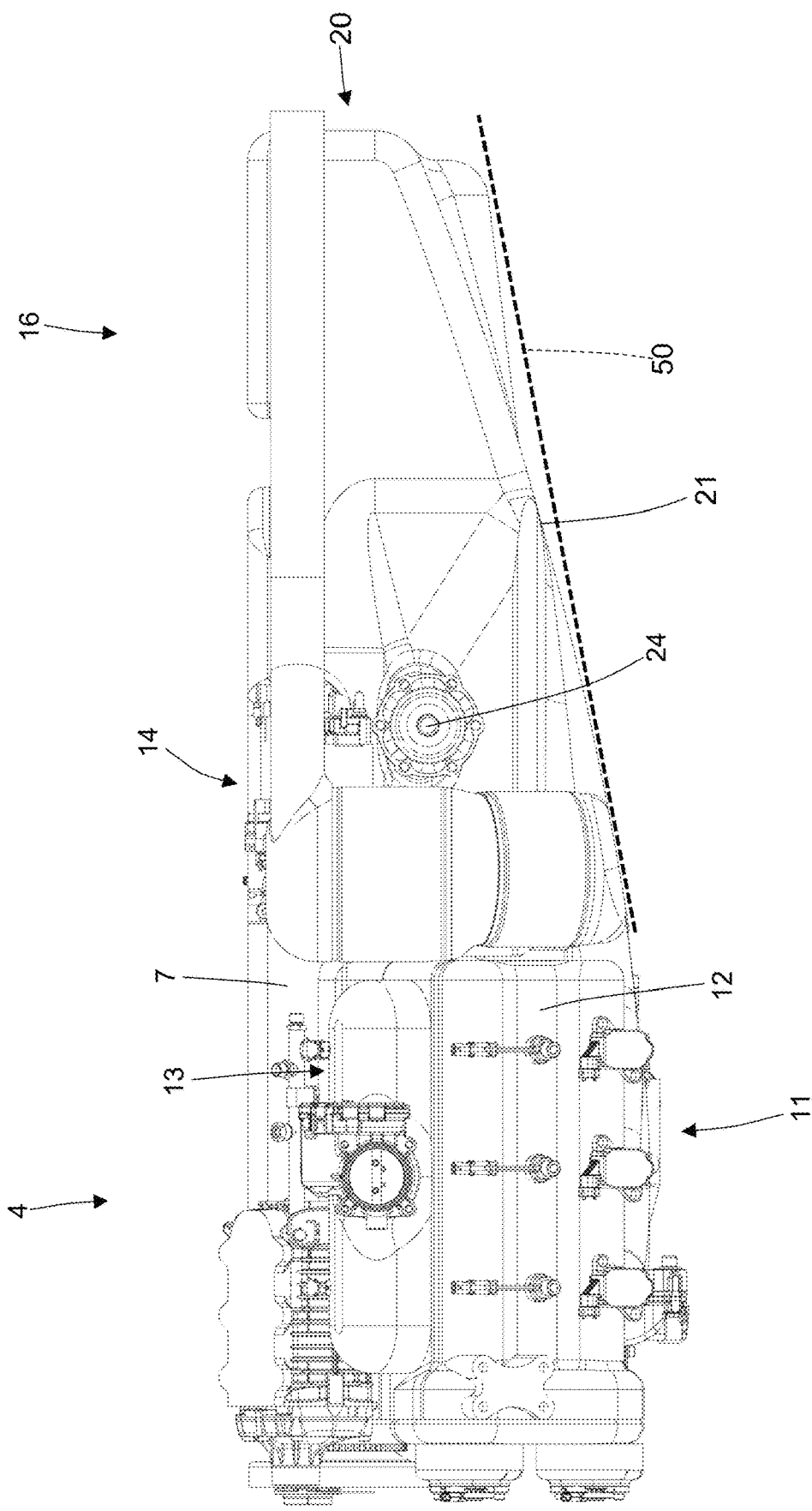

As illustrated in FIGS. 4, 5 and 6, the internal combustion engine 4 comprises an intake system 13 that draws air from the external environment into the cylinders 8, and comprises an exhaust system 14 that injects the exhaust gases from the cylinders 8 into the external environment.

Figure 3:
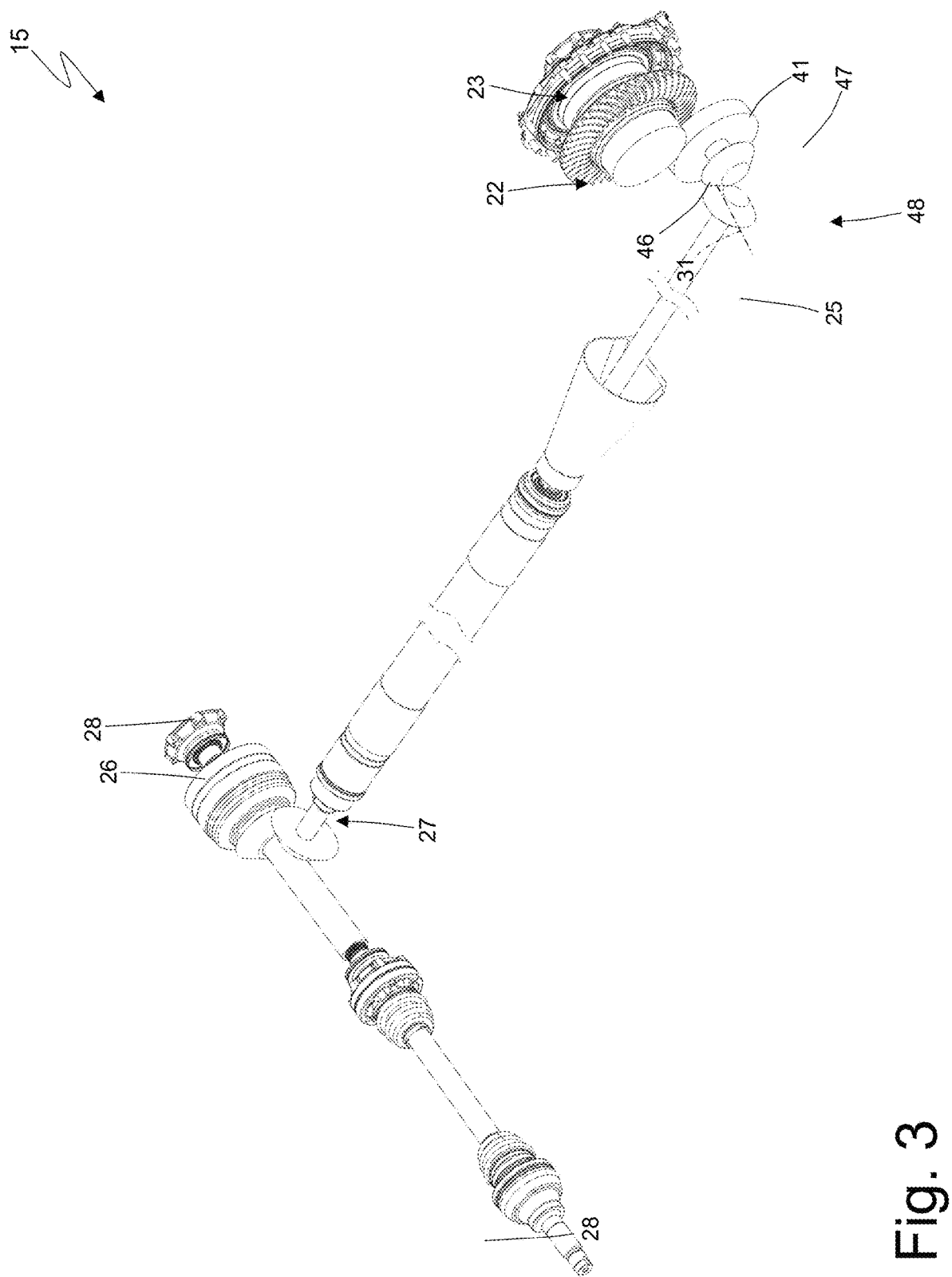

As illustrated in FIGS. 2 and 3, the car 1 comprises a transmission system 15 connecting the drive shaft 10 of the internal combustion engine 4 to the four drive wheels 2 and 3. The transmission system 15 comprises a dual-clutch gearbox 16 that is interposed between the drive shaft 10 of the internal combustion engine 4 and the rear drive wheels 3, is oriented longitudinally and is arranged behind the internal combustion engine 4 (as best illustrated in FIGS. 4, 5 and 6).

As illustrated in FIGS. 8-11, the gearbox 16 comprises a basket 17 that is brought into rotation by the drive shaft 10 and two clutches contained side by side in the basket 17 to take motion from the basket 17. Furthermore, the gearbox 16 comprises two primary shafts 18 that are coaxial with each other, are inserted one inside the other, and are each connected to a corresponding clutch to receive motion from the corresponding clutch. Each clutch comprises drive discs which are integral with the basket 17 (thus they always rotate together with the drive shaft 10 to which the basket 17 is constrained) and driven discs which are interspersed with the drive discs and are integral with the corresponding primary shafts 18 (thus they always rotate together with the corresponding primary shafts 18).

The dual-clutch gearbox 16 comprises a single secondary shaft 19 that transmits motion to the drive wheels 2 and 3; according to an alternative and equivalent embodiment, the dual-clutch gearbox 16 comprises two secondary shafts 19 that alternatively transmit motion to the drive wheels 2 and 3. The gearbox 16 has a plurality of gears and each primary shaft 18 and the secondary shaft 19 are mechanically coupled to each other by a plurality of gear mechanisms, each of which defines a respective gear and comprises a primary gear wheel mounted on the primary shaft 18 and a secondary gear wheel mounted on the secondary shaft 19. Each primary gear wheel is splined to a respective primary shaft 18 to rotate at all times integrally with the primary shaft 18 itself and meshes permanently with the respective secondary gear wheel; on the other hand, each secondary gear wheel is mounted idle on the secondary shaft 19. Furthermore, the gearbox 16 comprises dual synchronisers, each of which is mounted coaxial to the secondary shaft 19, is arranged between two secondary gear wheels, and is adapted to be actuated to alternately engage the two respective secondary gear wheels to the secondary shaft 19 (i.e., to alternately make the two respective secondary gear wheels 19 angularly integral with the secondary shaft 19). In other words, each synchroniser can be moved in one direction to engage one secondary gear wheel to the secondary 19 shaft, or it can be moved in the other direction to engage the other secondary gear wheel to the secondary 19 shaft.

According to a preferred embodiment illustrated in the accompanying figures, the primary shafts 18 of the gearbox 16 are coaxial with the drive shaft 10 of the internal combustion engine 4; that is, the internal combustion engine 4 is aligned with the gearbox 16.

As illustrated in FIGS. 4, 5 and 6, the gearbox 16 is directly connected to the drive shaft 10 of the internal combustion engine 4, is aligned with the internal combustion engine 4, and is arranged behind the internal combustion engine 4. Specifically, the gearbox 16 is vertically aligned with an upper part of the engine block of the internal combustion engine 4; i.e. the gearbox 16 is vertically aligned with the upper part of the crankcase 7.

As illustrated in FIGS. 4, 5 and 6, the car 1 comprises a containment body 20 which contains within it (also) the dual-clutch gearbox 16 and has a shape tapered towards the rear so that the height of the containment body 20 progressively decreases from the front to the rear. That is, a front wall of the containment body 20 is taller than a rear wall of the containment body 20. In particular, the containment body 20 has a bottom wall 21 at the bottom that is inclined with respect to the horizontal due to the tapered shape of the containment body 20.

As illustrated in FIGS. 2 and 3, the transmission system 15 comprises an epicyclic differential 22 which receives motion from the secondary shaft 19 of the gearbox 16 and transmits motion to both the front wheels 2 (i.e., the front axle) and the rear wheels 3 (i.e., the rear axle); in other words, the epicyclic differential 22 divides the motion coming from the internal combustion engine 4 (with the interposition of the gearbox 16) between the front wheels 2 (i.e. the front axle) and the rear wheels 3 (i.e. the rear axle).

The transmission system 15 comprises an epicyclic differential 23 which is coaxial to the two rear wheels 3, is interposed between the epicyclic differential 22 and the rear wheels 3, receives motion from the epicyclic differential 22 and transmits motion to the rear wheels 3 by means of two corresponding rear axle shafts 24 (also illustrated in FIG. 1), each of which is integral with a rear wheel 3 and exits laterally from the containment body 20.

In other words, the epicyclic differential 22 receives motion from the secondary shaft 19 of the gearbox 16 and distributes motion between the front and rear axles, while the epicyclic differential 23 receives motion from the epicyclic differential 22 and distributes motion between the two rear wheels 3.

The transmission system 15 comprises a transmission shaft 25 that is longitudinally oriented and is configured to transmit motion from the internal combustion engine 4 (with the interposition of the gearbox 16 and the epicyclic differential 22) arranged in a rear position to the front drive wheels 2; that is, a rear end of the transmission shaft 25 receives motion from the epicyclic differential 22 (which in turn receives it from the secondary shaft 19 of the gearbox 16) and a front end of the transmission shaft 25 transmits motion to the front drive wheels 2.

As best illustrated in FIG. 7, the transmission shaft 25 is arranged below the internal combustion engine 4 (which, as mentioned above, is oriented with the drive shaft 10 arranged higher than the cylinders 18). In particular, the transmission shaft 25 is arranged between the two banks 11 of cylinders 18, i.e. it is located in a space delimited laterally by the two banks 11 of cylinders 18.

According to the embodiment illustrated in FIGS. 2 and 3, the transmission system 15 comprises an epicyclic differential 26 which receives motion from the transmission shaft 25 via a bevel gear 27 which is arranged in a forward position and transmits motion to the front wheels 2 via two corresponding front axle shafts 28, each of which is integral with a front wheel 2.

According to the alternative embodiment illustrated in FIG. 1, the transmission system 15 is without the epicyclic differential 26 arranged at the front and a transmission shaft 29 is arranged at the front axle, which is oriented transversely (i.e. perpendicularly to the transmission shaft 25), is coaxial to the two front wheels 2 and receives motion from the transmission shaft 25 via the bevel gear 27. The drive shaft 29 at the two opposite ends is connected to the two front axle shafts 28 by the interposition of two front clutches 30. The function of the two front clutches 30 is to allow, when necessary, a difference in rotational speed between the two front wheels 2 and also to modify the drive torque applied to each front wheel 2 in order to carry out dynamic traction control ("Torque vectoring").

In the embodiments illustrated in the accompanying figures, the transmission shaft 25 receives motion from the secondary shaft 19 of the gearbox via the epicyclic differential 22. According to other non-illustrated embodiments, the transmission shaft 25 receives motion directly from the drive shaft 10 of the internal combustion engine 4 (thus upstream of the gearbox 16 instead of downstream of the gearbox 16) and obviously in these non-illustrated embodiments the epicyclic differential 22 is not present as it is not necessary; in these non-illustrated embodiments, the distribution of the drive torque to the two front wheels 2 can be carried out as described in patents EP2142395B1 and EP2228249B1 or it can be carried out using a torque converter that receives motion from the transmission shaft 25 and transmits motion to the front wheels 2.

As illustrated in FIG. 12, the two epicyclic differentials 22 and 23 are arranged coaxial to each other and rotate about the same axis 31 of rotation which is arranged transversely and coincides with the axis 31 of rotation of the two rear wheels 3. That is, the two rear wheels 3 rotate about the axis 31 of rotation which is arranged (oriented) transversely (perpendicular to the secondary shaft 19 of the gearbox 16) and is also coaxial to the two epicyclic differentials 22 and 23.

The epicyclic differential 22 comprises a ring gear 32 (i.e., a gear wheel with internal toothing) which receives motion from the secondary shaft 19 of the gearbox 16, a carrier 33 which supports at least two planet gears 34 (i.e., gear wheels with external toothing) and transmits motion to the epicyclic differential 23, and a sun gear 35 (i.e., a centrally arranged gear wheel with external toothing) which transmits motion to the transmission shaft 25; the carrier 33 is a structure that acts as a frame for the pivots of two or more planet gears 34 interposed between the sun gear 35 and the ring gear 32.

The epicyclic differential 23 comprises a ring gear 36 (i.e., a gear wheel with internal toothing) which is integral with the carrier 33 of the epicyclic differential 22 to receive motion from the carrier 33, a carrier 37 which supports at least two planet wheels 38 (i.e., gear wheels with external toothing) and is integral with a rear axle shaft 24 to transmit motion to a rear wheel 3, and a sun gear 39 (i.e., a centrally arranged gear wheel with external toothing) which is integral with the other axle shaft 24 to transmit motion to the other rear wheel 3; the carrier 37 is a structure that acts as a frame for the pivots of two or more planet gears 38 interposed between the sun gear 39 and the ring gear 36.

According to a preferred embodiment, the epicyclic differential 22 is centrally hollow and is crossed from side to side by one of the rear axle shafts 24. In addition, there is a hollow connection shaft 40 (one of the rear axle shafts 24 passes through it) which at one end is integral with the carrier 33 of the epicyclic differential 22 and at the opposite end is integral with the ring gear 36 of the epicyclic differential 23. The connection shaft 40 passes through a central through-hole formed through the ring gear 32 of the epicyclic differential 22 (through which one of the two rear axle shafts 24 also passes).

Figure 8:
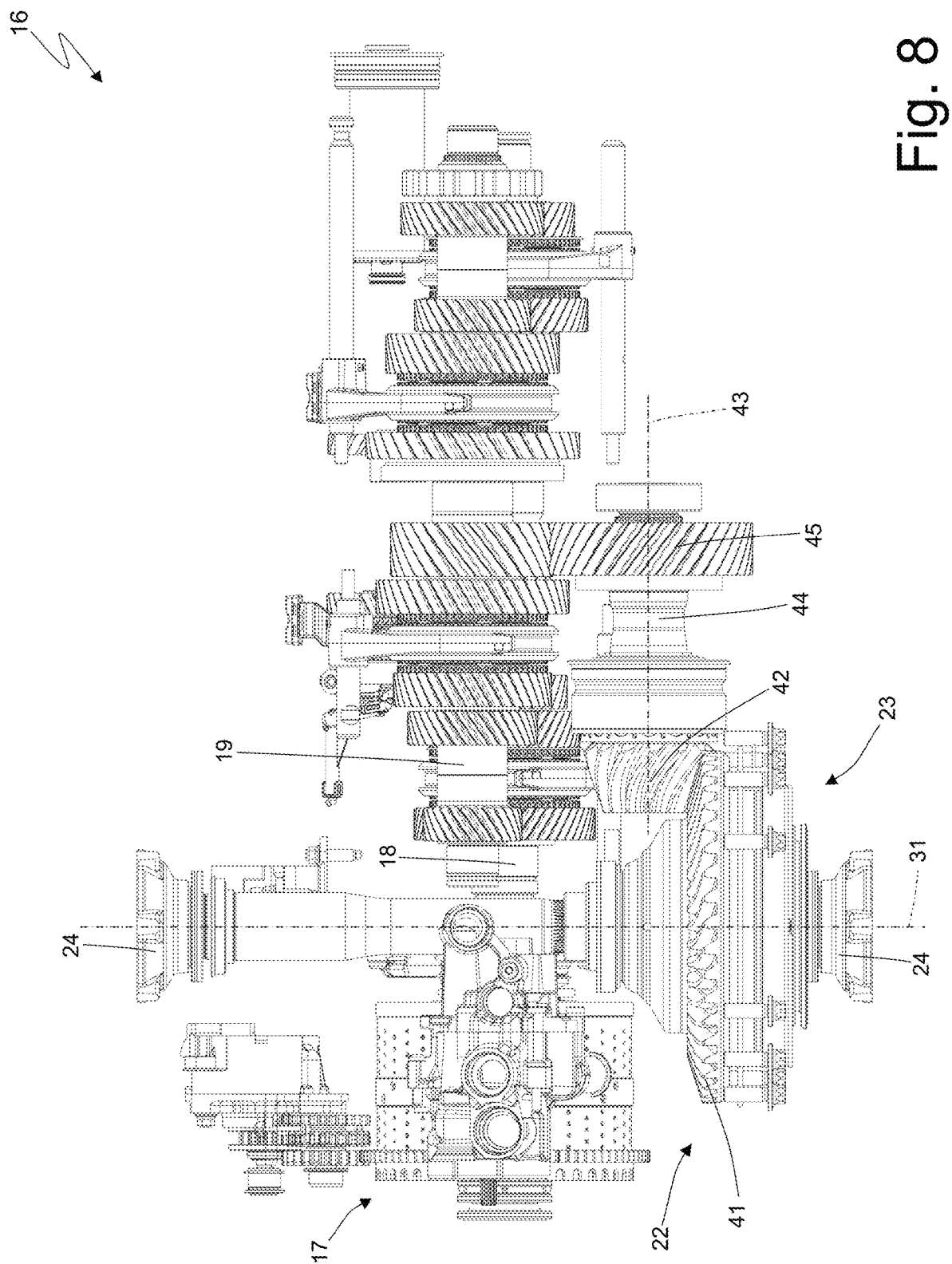
FIGS. 8-11 are a plan view and three different perspective views, respectively, of a gearbox of the car in FIG. 1 with parts removed for clarity.
Figure 9:
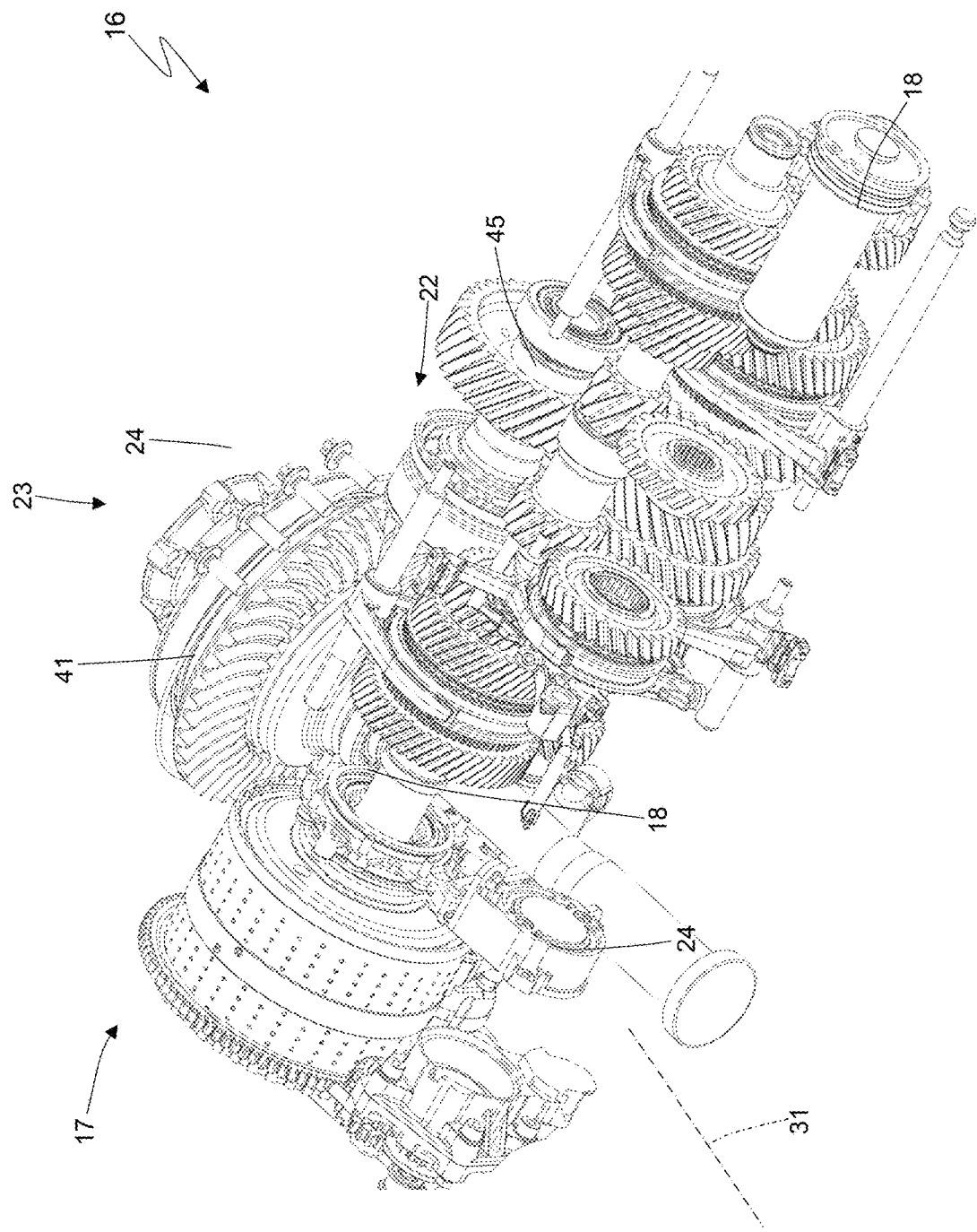

According to a preferred embodiment, the ring gear 32 of the epicyclic differential 22 has an external bevel-shaped toothing 41 (illustrated in FIGS. 8-11) which meshes with an intermediate bevel-shaped gear wheel 42 which receives motion from the secondary shaft 19 of the gearbox 16 and rotates about an axis 43 of rotation (transversely oriented) perpendicular to the axis 31 of rotation of the ring gear 32 of the epicyclic differential 22 (longitudinally oriented). As best illustrated in FIG. 8, the intermediate bevel-shaped gear wheel 42 is mounted on a support shaft 44 (oriented longitudinally and rotating about the axis 43 of rotation) which receives motion from the secondary shaft 19 of the gearbox 16 via a gear wheel 45.

Figure 10:
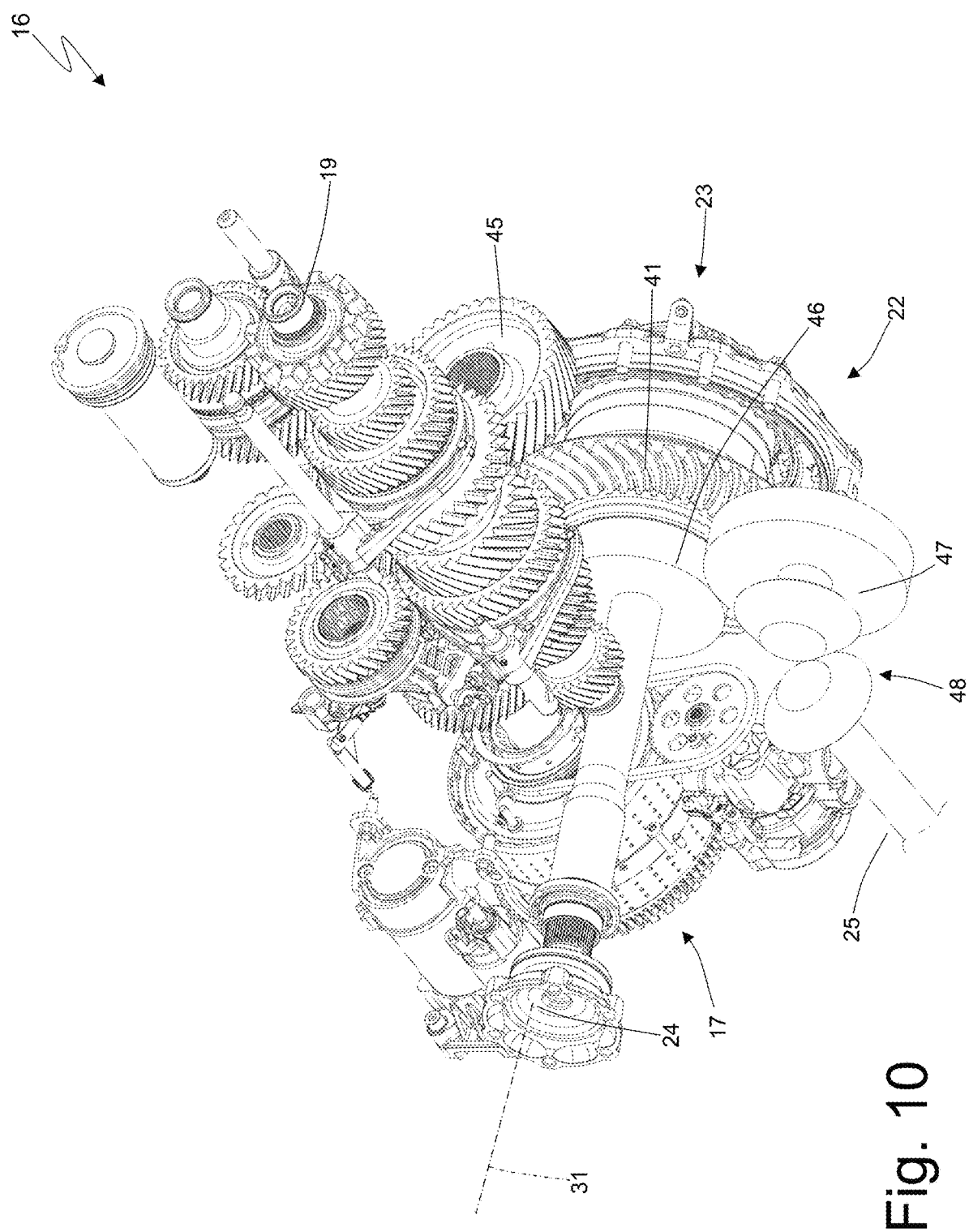
Figure 11:
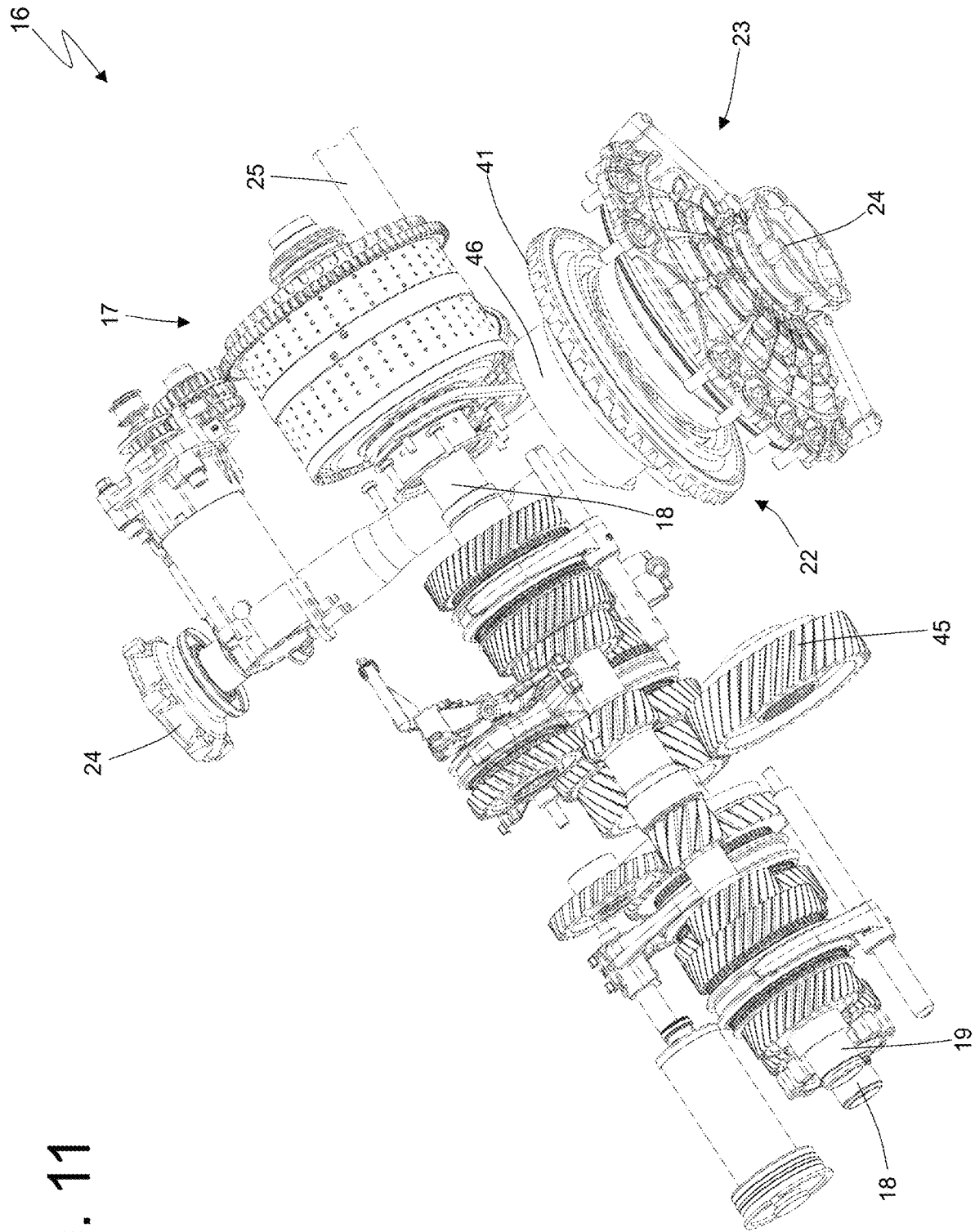

According to a preferred embodiment best illustrated in FIG. 10, the transmission system 15 comprises a transmission gear wheel 46 that is coaxial and integral with the sun gear 35 of the epicyclic differential 22, a transmission gear wheel 47 that meshes with the transmission gear wheel 46, and a bevel gear 48 that connects the transmission gear wheel 47 to the transmission shaft 25.

According to a preferred embodiment best illustrated in FIG. 12, there is a hollow connecting shaft 49 (one of the rear axle shafts 24 passes through it) which connects (i.e. makes integral) the transmission gear wheel 46 to the sun gear 35 of the epicyclic differential 22. The connection shaft 49 passes through a central through-hole formed through the ring gear 32 of the epicyclic differential 22 (through which one of the two rear axle shafts 24 also passes).

As illustrated in FIG. 6, the car 1 comprises a rear aerodynamic extractor 50 which faces the road surface, starts at a rear wall of the engine block (comprising the crankcase 7 and cylinder heads 12) of the internal combustion engine 4 and is arranged below the gearbox 16 (i.e. below the containment body 20 in which the gearbox 16 is located). According to a preferred embodiment, the bottom wall 21 of the containment body 20 (inside which the gearbox 16 is located) has the same inclination as the rear aerodynamic extractor 50; that is, the bottom wall 21 of the containment body 20 reproduces the shape of the rear aerodynamic extractor 50 having the same inclination as it. In this way, the rear aerodynamic extractor 50 exploits all the available space underneath the gearbox 16 (i.e. below the containment body 20 in which the gearbox 16 is located).

In the embodiment in which the internal combustion engine 5 is not powered by hydrogen but is powered by a liquid fuel, the liquid fuel tank has a much smaller volume than the hydrogen tanks 15 and 16 and, not being under pressure, can have a "complex" shape to be arranged in other non-regularly shaped volumes (whereas the hydrogen tanks 15 and 16 have to withstand a pressure of many hundreds of bar and must therefore have a cylindrical or spherical shape); thus, in this embodiment, the (large) volume above the internal combustion engine 5 is free and can be used to give the body a particular shape to optimise aerodynamic efficiency.

The embodiments described here can be combined.

The car 1 as described above has many advantages.

Firstly, the car 1 described above allows a four-wheel drive to be implemented having an optimal distribution of masses, i.e. the car 1 described above has its centre of gravity in a central position (between the two axles) and very low (i.e. close to the road surface). This result is achieved thanks to the transmission shaft 25 which passes below the internal combustion engine 4 exploiting the space between the two banks 11 of cylinders 8 (as clearly illustrated in FIG. 7). This makes it possible to set the centre of gravity of the internal combustion engine 4 very low (without having to raise the position of the internal combustion engine 4 in any way to make room for the transmission shaft 25). Thus, in the car 1 described above, it is possible to achieve a particularly favourable (i.e. compact while being very functional) positioning of all the elements of the drive system in order to minimise the length of the wheelbase (i.e. the distance between the front and rear axles) and to place the centre of gravity of the car 1 in a central and very low position.

In addition, the car 1 described above allows the construction of an extremely large rear aerodynamic chute (extractor), thus enabling the generation of a very high aerodynamic load without any penalisation of drag. In the car 1 as described above, the aerodynamic extractor 50 has a very large size (i.e. it generates a high aerodynamic load for a modest increase in drag) even though the internal combustion engine 4 is located in a central/rear position (thus having an optimal distribution of masses between the front and rear axles) and, at the same time, the wheelbase is relatively short (i.e. the car 1 exhibits extremely high-performance dynamic behaviour). This is achieved, among other things, by placing the internal combustion engine 4 with the drive shaft 10 higher up. This also allows the gearbox 16 to be placed higher up, thus freeing up space in the lower part of the rear of the car 1 to accommodate the very large aerodynamic extractor 50.

Finally, the "V"-shaped arrangement of the cylinders 8 of the internal combustion engine 4 allows the "hot" zone (i.e. the exhaust system 14 particularly close to the cylinders 8) to be arranged at the bottom of the internal combustion engine 4 (below the internal combustion engine 4) and thus away from the hydrogen tanks 16 which are arranged above the internal combustion engine 4 (and thus the hydrogen tanks 16 do not receive heat from the exhaust system 14). Furthermore, the "V"-shaped arrangement of the cylinders 8 of the internal combustion engine 4 allows the "cool" zone (i.e. the intake system 13) to be arranged at the top of the internal combustion engine 4 (above the internal combustion engine 4) and thus close to the hydrogen tanks 16 which are arranged above the internal combustion engine 4 (but the temperature of the intake system 13 is essentially ambient and thus unable to heat the hydrogen tanks 16). In other words, the "V"-shaped arrangement of the cylinders 8 allows for significantly improved heat management compared to the in-line arrangement of the cylinders 8, since in the "V"-shaped arrangement of the cylinders 8 the "hot" zone (i.e. the exhaust system 14 particularly close to the 8 cylinders) is far away from the hydrogen tanks 16.

LIST OF REFERENCE NUMBERS OF THE FIGS.

1 car
2 front wheels
3 rear wheels
4 internal combustion engine
5 passenger compartment
6 tank
7 crankcase
8 cylinders
9 pistons
10 drive shaft
11 bank
12 cylinder head
13 intake system
14 exhaust system
transmission system
16 gearbox
17 basket
18 primary shafts
19 secondary shaft
containment body
21 bottom wall
22 epicyclic differential
23 epicyclic differential
24 rear axle shafts
25 transmission shaft
26 epicyclic differential
27 bevel gear
28 front axle shafts
29 transmission shaft
30 front clutches
31 axis of rotation
32 ring gear
33 carrier
34 planet gears
35 sun gear
36 ring gear
37 carrier
38 planet gears
39 sun gear
40 connection shaft
41 toothing
42 intermediate gear wheel
43 axis of rotation
44 support shaft
45 gear wheel
46 transmission gear wheel
47 transmission gear wheel
48 bevel gear
49 connection shaft
50 rear aerodynamic extractor
L longitudinal direction
T transverse direction
V vertical direction

The invention claimed is:

1. A car (1) comprising:
a first axle having two first drive wheels (2);

a second axle having two second drive wheels (3);

a passenger compartment (5);

an internal combustion engine (4), which is provided with a plurality of cylinders (8), where respective pistons (9) slide on the inside, and with a drive shaft (10) connected to the pistons (9) and oriented longitudinally, namely parallel to a driving direction of the car (1);

a transmission shaft (25), which is oriented longitudinally and is configured to transmit the motion from the internal combustion engine (4) to the first wheels (2);

a gearbox (16) provided with at least one primary shaft (18), which receives the motion from the drive shaft (10), and with at least one secondary shaft (19);

a first epicyclic differential (22), which receives the motion from the secondary shaft (19) of the gearbox (16) and transmits the motion to the first wheels (2) through the transmission shaft (25) and to the second wheels (3); and a second epicyclic differential (23), which is coaxial to the two second wheels (3), is interposed between the first epicyclic differential (22) and the second wheels (3), receives the motion from the first epicyclic differential (22) and transmits the motion to the second wheels (3);

wherein the two differentials (22, 23) are coaxial to one another and are arranged side by side.

2. The car (1) according to claim 1, wherein the first epicyclic differential (22) comprises:

a first ring gear (32), which receives the motion from the secondary shaft (19) of the gearbox (16);

a first carrier (33), which supports at least two first planet gears (34) and transmits the motion to the second epicyclic differential (23); and a first sun gear (35), which transmits the motion to the transmission shaft (25).

3. The car (1) according to claim 2, wherein the second epicyclic differential (23) comprises:

a second ring gear (36), which is integral to the first carrier (33) to receive the motion from the first carrier (33);

a second carrier (37), which supports at least two second planet gears (38) and is integral to a first axle shaft (24) to transmit the motion to a second wheel (3); and a second sun gear (39), which is integral to a second axle shaft (24) to transmit the motion to the other second wheel (3).

4. The car (1) according to claim 3, wherein the first epicyclic differential (22) is centrally hollow and is crossed, from side to side, by the second axle shaft (24).

5. The car (1) according to claim 3, wherein a hollow connection shaft (40) is provided, which, at an end, is integral to the first carrier (33) and, at the opposite end, is integral to the second ring gear (36).

6. The car (1) according to claim 2, wherein the first ring gear (32) has an outer toothing (41), which meshes with an intermediate gear wheel (42), which receives the motion from the secondary shaft (19) of the gearbox (16).

7. The car (1) according to claim 6, wherein the outer toothing (41) of the first ring gear (32) is a bevel toothing and the intermediate gear wheel (42) is a bevel wheel and rotates around a rotation axis (43), which is perpendicular to the rotation axis (31) of the first ring gear (32).

8. The car (1) according to claim 2 and comprising:

a first transmission gear wheel (46), which is coaxial and integral to the first sun gear (35); and a second transmission gear wheel (47), which meshes with the first transmission gear wheel (46).

9. The car (1) according to claim 8 and comprising a first bevel gear (48), which connects the second transmission gear wheel (47) to the transmission shaft (25).

10. The car (1) according to claim 1, wherein the two epicyclic differentials (22, 23) rotate around a rotation axis (31), which is oriented transversely and is perpendicular to the secondary shaft (19) of the gearbox (16).

11. The car (1) according to claim 1 and comprising a second bevel gear (27), which is interposed between the transmission shaft (25) and the first wheels (2).

12. The car (1) according to claim 1 wherein:

the internal combustion engine (4) is arranged behind the passenger compartment (5), is "V"-shaped, has two banks (11) of cylinders (8), which are separate from one another, and is oriented with the drive shaft (10) arranged higher than the cylinders (8); and the transmission shaft (25) is arranged under the internal combustion engine (4).

13. The car (1) according to claim 12, wherein the transmission shaft (25) is arranged between the two banks (11) of cylinders (8), namely is located in a space that is laterally delimited by the two banks (11) of cylinders (8).

14. The car (1) according to claim 1, wherein the first axle is in a front position and the second axle is in a rear position.

15. The car (1) according to claim 1, wherein:

the gearbox (16) is longitudinally arranged behind a crankcase (7) of the internal combustion engine (4); and the primary shaft (18) of the gearbox (16) is oriented longitudinally and is coaxial to the drive shaft (10) of the internal combustion engine (4).

* * * * *